(12) United States Patent
Wiemer et al.

(10) Patent No.: US 12,399,723 B2
(45) Date of Patent: Aug. 26, 2025

(54) METHOD FOR SAFELY STARTING AN ARITHMETIC LOGIC UNIT

(71) Applicant: Robert Bosch GmbH, Stuttgart (DE)

(72) Inventors: Friedrich Wiemer, Pleidelsheim (DE); Lukas Heberle, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 683 days.

(21) Appl. No.: 17/855,871

(22) Filed: Jul. 1, 2022

(65) Prior Publication Data

US 2023/0015692 A1    Jan. 19, 2023

(30) Foreign Application Priority Data

Jul. 5, 2021   (DE) .................... 10 2021 207 019.1
Mar. 28, 2022  (DE) .................... 10 2022 202 998.4

(51) Int. Cl.
*G06F 9/44*      (2018.01)
*G06F 9/445*     (2018.01)

(52) U.S. Cl.
CPC .................... *G06F 9/445* (2013.01)

(58) Field of Classification Search
CPC ....................................... G06F 9/445
USPC ......................................... 718/102
See application file for complete search history.

(56) References Cited

U.S. PATENT DOCUMENTS

| | | | | |
|---|---|---|---|---|
| 2006/0070057 A1* | 3/2006 | Watanabe | ............... | G06F 21/57 717/170 |
| 2017/0293765 A1* | 10/2017 | Kang | ................... | G06F 21/602 |
| 2019/0347432 A1* | 11/2019 | Boivie | .................... | G06F 21/57 |
| 2023/0094125 A1* | 3/2023 | Rogers | .................. | H04L 9/0877 713/190 |

OTHER PUBLICATIONS

FIPS PUB 186-4, "Digital Signature Standard (DSS)," Federal Information Processing Standards Publication, 2013, pp. 1-130.
Krawczyk et al., "HMAC: Keyed-Hashing for Message Authentication," RFC 2104, 1997, pp. 1-11.
FIPS PUB 198-1, "The Keyed-Hash Message Authentication Code (HMAC)," Federal Information Processing Standards Publication, 2008, pp. 1-13.
NIST Special Publication 800-38B, Morris Dworkin, "Recommendation for Block Cipher Modes of Operation: the CMAC Mode for Authentication," National Institute of Standards and Technology, 2016, pp. 1-21.

* cited by examiner

*Primary Examiner* — Timothy A Mudrick
(74) *Attorney, Agent, or Firm* — NORTON ROSE FULBRIGHT US LLP

(57) ABSTRACT

A method for safely starting an arithmetic logic unit that includes a plurality of computer kernels, software being started which includes multiple computer-program parts that form one or more computer programs. The method includes: implementation of an integrity check of the computer-program parts, the integrity check being carried out in parallelized fashion utilizing at least two of the plurality of computer kernels at least to some extent simultaneously; and execution of one computer program of the one or more computer programs by the arithmetic logic unit if the integrity of the computer-program parts, which form the computer program, was confirmed.

16 Claims, 2 Drawing Sheets

METHOD FOR SAFELY STARTING AN ARITHMETIC LOGIC UNIT

CROSS REFERENCE

The present application claims the benefit under 35 U.S.C. § 119 of German Patent Application Nos. DE 10 2021 207 019.1 filed on Jul. 5, 2021, and DE 10 2022 202 998.4 filed on Mar. 28, 2022, which is expressly incorporated herein by reference in its entirety.

FIELD

The present invention relates to a method for safely starting an arithmetic logic unit that includes a plurality of computer kernels, as well as an arithmetic logic unit and a computer program for its implementation.

BACKGROUND INFORMATION

An essential part of the safety architecture of an arithmetic logic unit lies in preventing manipulated software, that is, manipulated computer programs, from being executed. To that end, the integrity of the software, especially firmware, which is executed by the arithmetic logic unit may be protected, that is, manipulation or change of the software may be prevented or at least recognized. To achieve this, the software may be stored in an OTP memory (one time programmable memory). It is particularly important to ensure the integrity of executed software or firmware when the arithmetic logic unit is a control unit of a vehicle or other machine (that is, a microcontroller included in such a control unit), since the resources of the control unit are limited there and a malfunction caused by a manipulation may have a direct effect on the surroundings, for instance, on the safety of a vehicle or of components processed by a machine.

SUMMARY

According to the present invention, a method is proposed for safely starting an arithmetic logic unit which includes a plurality of computer kernels, as well as an arithmetic logic unit and a computer program for its implementation. Advantageous refinements of the present invention are disclosed herein.

The present invention employs the measure of checking the integrity of software prior to starting the software, the integrity checks being carried out in parallelized fashion. This is advantageous, since the execution of unchecked, possibly manipulated software is prevented, and at the same time, short start times are ensured compared to a sequential check of software, the software being able to be reprogrammed since it is possible to dispense with the use of a one time programmable memory. This applies especially to embedded systems, e.g., control units of vehicles or other machines, in which tight start times or boot times often must be observed.

In accordance with an example embodiment of the present invention, in the method for safely starting an arithmetic logic unit that includes a plurality of computer kernels, software is started which includes multiple computer-program parts that form one or more computer programs. That is, each computer program is formed independently of each other from one computer-program part or from multiple computer-program parts. The term "computer programs" is used here for those computer programs which, when executed, implement the actual function of the arithmetic logic unit, that is to say, the computer programs are programmed accordingly. They thus form the software of the arithmetic logic unit which, in particular, may be a microcontroller, the software in this case, or rather the computer programs, being referred to as firmware.

The method includes implementation of an integrity check of the computer-program parts, the integrity check being carried out in parallelized fashion utilizing at least two of the plurality of computer kernels at least to some extent simultaneously, and execution of one computer program of the one or more computer programs by the arithmetic logic unit, if the integrity of the computer-program parts which form the computer program was confirmed. This last step, even if not mentioned explicitly, is, of course, carried out for all computer programs whose computer-program parts are confirmed. "Execution of one computer program" could thus be read as "execution of at least one computer program." If the integrity of a computer-program part is not confirmed (either because the integrity check fails or because the integrity check was not (yet) initiated), in particular, the method may include inhibiting or preventing the execution of the one or one of the multiple computer programs which contains this unconfirmed computer-program part.

The term "computer kernel" is used here in the sense of computer kernels or processor kernels independent of each other. They may be "all-purpose" computer kernels which execute program code in order to implement specific functions, e.g., to perform an integrity check, or hardware computer kernels which implement one specific function (especially cryptographic functions) in hardware, e.g., hardware accelerator kernels. The second of these possibilities has the advantage that high speed may be achieved, while in the case of the first possibility, the computer kernel may be used for several different functions (according to different program code) (e.g., for executing the software after the integrity check). Combinations of both possibilities are possible, as well. Preferably, however, hardware computer kernels or hardware accelerator kernels are used.

In accordance with an example embodiment of the present invention, the integrity check is carried out preferably with the aid of a digital signature and/or a message authentication code. These are conventional cryptographic methods, which may be utilized for the integrity check. During the integrity check, memory areas in which the computer-program parts are stored (e.g., each computer-program part is stored in a memory area assigned to it) are checked specifically for their integrity, that is, as to whether the data stored in them are unchanged.

Message authentication codes, MAC for short, make it possible to check the integrity and the authenticity of a message or of data, here of the computer-program parts or rather the data which are stored in the memory areas of a memory and which correspond to the computer-program parts. In this context, a MAC algorithm uses the data to be checked on one hand and a private key on the other hand as a pair of inputs, and from this pair, calculates a checksum, referred to as MAC, for the data. If the data were changed, this may be determined by comparison to a reference MAC calculated earlier. In the practical application here, it may thus be determined whether the contents of a memory area to be checked (each memory area to be checked corresponds here to one computer-program part, for example) is unchanged or was changed. If the latter is the case, it must be assumed that computer-program parts or other data stored in the memory area were manipulated. MAC algorithms are conventional to one skilled in the art. Preferably, it is provided to use a keyed-hash-message authentication code (HMAC; see, for instance, NIST Standard FIPS 198 or RFC 2104 for a possible implementation) and/or a cipher-based-message authentication code (CMAC; see, for instance, NIST Special Publication 800-38B for a possible implementation).

A digital signature may be realized by an asymmetrical cryptosystem. In that case, a value, referred to as digital signature, is calculated for data to be signed (here computer-program parts or rather the corresponding memory data in memory areas) with the aid of a signature function utilizing a private key. By a verification function, utilizing a public key, it may be checked whether data were changed compared to the signed data. Conventional signature methods are, e.g., RSA (Rivest-Shamir-Adleman) or DSA (Digital Signature Algorithm); see, for instance, NIST Standard FIPS 186-4.

In both cases, cryptographic algorithms are used which are able to be parallelized, so that the integrity check of a single computer-program part may be distributed over several computer kernels which operate simultaneously, in parallel. Examples are block ciphers which operate in the cipher block chaining mode (able to be parallelized upon decipherment), which operate in the counter mode or which operate in the Galois counter mode. The latter has the further advantage that not only the integrity, but also the confidentiality may thereby be protected. Cryptographic primitives used in the respective algorithms are likewise able to be parallelized. Examples are SHA3 (for hash calculations), ECC operations (for public key methods) or Farfalle (e.g., for AEAD ciphers).

Digital signatures and message authentication codes may also be used in combined fashion. For example, a MAC may be calculated with the aid of a MAC algorithm for a computer-program part (or rather, the memory area in which it is stored), and from this MAC, with the aid of a signature function, a signature may be calculated which is then verified or checked by a suitable verification function.

In accordance with an example embodiment of the present invention, the integrity of a number (especially greater than 1) of computer-program parts (that is, a quantity of the computer-program parts), which belong in particular to the same computer program, may also be checked together, message authentication codes and/or digital signatures being utilized in nested manner, that is, based on a tree-like structure with multiple layers. In so doing, initially first intermediate check values are determined by applying a MAC algorithm or a signature function to individual ones of the computer-program parts; this is accomplished in at least partially parallelized manner. At least one character string is then formed from at least some of the first intermediate check values, e.g., by joining together, and a MAC algorithm or a signature function (which are independent of the MAC algorithm or the signature function that was used for determining the first intermediate check values) is applied to this character string in order to determine an (ultimate) check value or at least a second intermediate check value. The (ultimate) check value is compared to a reference check value, the character string being formed here from all first intermediate check values. A MAC algorithm or a signature function may be applied to the second intermediate check value (if only one is determined), in order to obtain the (ultimate) check value. In the same way, if several second intermediate check values are determined, a further character string may be formed from the second intermediate check values, and a MAC algorithm or a signature function may be applied to it in order to obtain the (ultimate) check value or at least a third intermediate check value.

This nested procedure in several layers may be continued. In each case, the (ultimate) check value is compared to a reference check value, and if they are identical, the integrity is confirmed, and if they are not identical, the integrity is not confirmed. In each layer, the individual (first, second) intermediate check values are determined independently of each other, so that the corresponding calculations may be carried out at least to some extent in parallel in different computer kernels. The MAC algorithm or the signature function of each layer may be selected independently of the MAC algorithm or the signature function of other layers.

The following illustration is (mathematically formulated) an example with three layers:

$$(m_1, \ldots, m_n) \mapsto G_{k_o}(F_{k_y}(F_{k_1}(m_1) \| \ldots \| F_{k_n}(m_n)))$$

Here, $m_1, \ldots, m_n$ are computer-program parts, F is a MAC algorithm or a MAC function, G is a signature function, $k_o$ is the (private) key which is used in the signature function, $k_y$ is the key which is used for the last MAC calculation, and $k_1$ to $k_n$ are the keys which are used for the individual MAC calculations. For simplification, the same key may be used for $k_y$ and $k_1$ to $k_n$.

Correspondingly, in accordance with an example embodiment of the present invention, the method preferably includes a joint integrity check of a specific quantity of the multiple computer-program parts, the specific quantity including more than one computer-program part, where in the joint integrity check, an intermediate check value is determined in parallelized fashion for each computer-program part of the specific quantity utilizing at least two of the plurality of computer kernels at least to some extent simultaneously, and based on the intermediate check values, an ultimate check value is determined and compared to a reference check value. Namely, if the ultimate check value is equal to the reference check value, the integrity is confirmed, and if the ultimate check value is not equal to the reference check value, the integrity is not confirmed. To determine the intermediate check values and the ultimate check value, in each case a MAC algorithm or a signature function is used independently of each other, respective keys (which are used in the respective MAC algorithm or in the respective signature function) likewise being able to be selected independently of each other. Intermediate check values are preferably joined together in order to apply a further MAC algorithm or a further signature function to the character string obtained by the joining together, so that the ultimate check value or a further intermediate check value (of a higher layer) is obtained.

In accordance with an example embodiment of the present invention, the method preferably includes—particularly immediately after the arithmetic logic unit is started—the execution of a boot program (that is, start program) by the arithmetic logic unit, the boot program preferably being stored at least partially in an unalterable memory area and/or being stored in a memory area protected from changes; the boot program is designed to prompt the integrity check of the computer-program parts and to prompt the execution of a computer program for which the integrity of the computer-program parts that form the computer program was confirmed. Namely, the boot program is programmed correspondingly. The execution immediately after the start of the arithmetic logic unit ensures that the execution of unchecked computer programs is not possible. For example, the protected storage may be realized with the aid of a hardware security module (HSM).

The arithmetic logic unit is preferably a microcontroller or a microprocessor. The use of the method according to the present invention is particularly advantageous in the case of microcontrollers, since microcontrollers implement control functions in vehicles and/or machines which may be time-critical, microcontrollers typically having only limited computing resources.

In accordance with an example embodiment of the present invention, the integrity check is accomplished preferably by way of a cryptographic algorithm able to be parallelized; the integrity check of a single computer-program part is carried out at least to some extent simultaneously in different computer kernels. A computer program (formed of a single computer-program part) may thus be checked in parallelized fashion and started quickly accordingly (if the integrity is confirmed).

The integrity check of at least two different computer-program parts which form the same computer program (possibly with further computer-program parts) is carried out preferably in at least two different computer kernels in a manner overlapping in time. The computer program may thus be started as early as possible.

Preferably, the one or at least one of the multiple computer programs is formed by a number of computer-program parts which is equal to the number of computer kernels; the integrity check of the computer-program parts which form the at least one computer program is carried out at least to some extent simultaneously in different computer kernels. That is, the integrity check of the computer-program parts of this computer program is brought about in such a way that each computer-program part is checked utilizing a different computer kernel, the computer kernels being used (at least to some extent) simultaneously for this purpose.

In accordance with an example embodiment of the present invention, the method preferably includes checking whether one computer kernel of the plurality of computer kernels is available for use in an integrity check; and if a computer kernel is available, selecting one computer-program part whose integrity was not yet checked and is not being checked at the moment, and starting the integrity check for the selected computer-program part; preferably, a computer-program part is selected which, together with another computer-program part for which the integrity check was already carried out or is being carried out at the moment, forms a computer program and/or preferably a computer-program part is selected having a highest possible priority according to a predetermined prioritization. If no computer kernel is available, preferably there is a further wait and it is checked again whether a computer kernel is available. This is especially advantageous if the computer programs are being changed—in the course of which their size and the number of computer-program parts possibly changing as well—since a corresponding change of a boot program may thus be omitted.

In selecting, preferably the computer kernels are selected according to an integrity-check computing power which they exhibit with regard to the integrity check; the selection is carried out according to a descending order of the integrity-check computing power; and/or in selecting, computer kernels are excluded whose integrity-check computing power lies below a predetermined threshold. Thus, in each case, that available computer kernel of the available computer kernels which exhibits the highest computing power is selected. If several available computer kernels have the same computing power, any of these computer kernels is selected. This specific embodiment is particularly advantageous if the integrity check is carried out both by hardware accelerator computer kernels and by all-purpose computer kernels, since in this case, the first exhibit a markedly higher computing power with respect to integrity checks.

An arithmetic logic unit according to the present invention, e.g., an electronic control unit of a motor vehicle, is equipped, particularly in terms of program engineering, to carry out a method according to the present invention. In particular, the arithmetic logic unit is a microcontroller or includes one.

Preferably, the arithmetic logic unit is designed, immediately after it is started, to initiate the start of a boot program.

The implementation of a method according to the present invention in the form of a computer program, especially a boot program, or computer-program product having program code for carrying out all method steps is also advantageous, since the costs it entails are particularly low, especially if an executing control unit is also being used for other tasks and is therefore present in any case. Suitable data carriers for holding the computer program ready are, in particular, magnetic, optical and electrical memories like, e.g., hard disks, flash memories, EEPROMs and DVDs, among others. Download of a program via computer networks (Internet, intranet, etc.) is also possible.

Further advantages and refinements of the present invention are derived from the description and the figures.

The present invention is represented schematically in the figures on the basis of exemplary embodiments, and is described in the following with reference to the figures.

DETAILED DESCRIPTION OF EXAMPLE EMBODIMENTS

Figure 1:
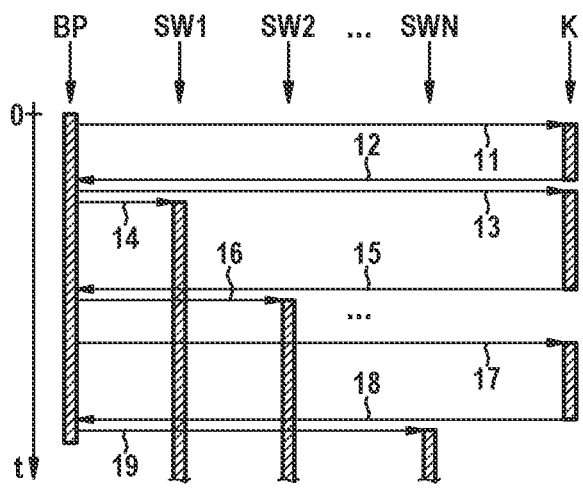
FIG. 1 shows a boot sequence, not according to the present invention ("Related Art"), of an arithmetic logic unit.
Figure 2:
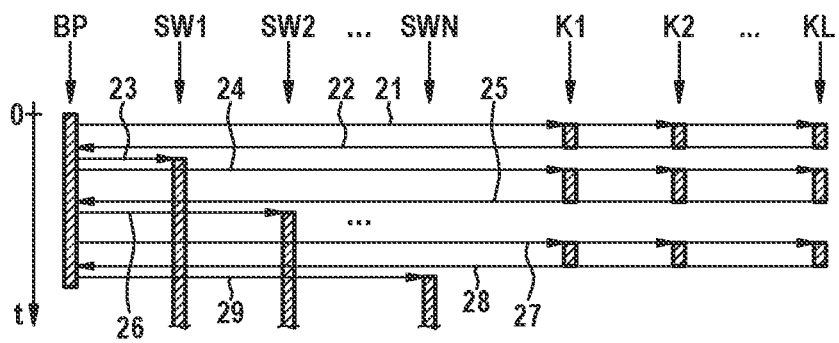
FIG. 2 shows a boot sequence of an arithmetic logic unit according to two preferred embodiments of the present invention.
Figure 3:
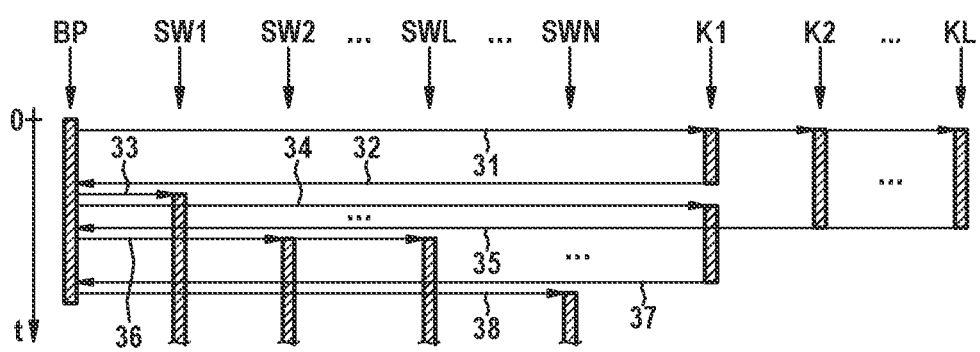
FIG. 3 shows a boot sequence of an arithmetic logic unit according to a further preferred embodiment of the present invention.

FIGS. 1 through 3 each show processes, namely, the execution of programs and integrity checks, in their chronological order, a time axis, that is, the time t being drawn in running downward, and those processes which relate to a specific element (program, computer kernel) designated in each case in a top line of the figures, being drawn in in columns. In each instance, the functional sequence of the processes is symbolized in the figures by hatched bars.

FIG. 1 shows a boot sequence or start sequence of an arithmetic logic unit not according to the present invention, in which one computer kernel K is used for the integrity check. First of all, with the start or switching on of the arithmetic logic unit, a boot program BP which controls the sequence of the boot process is called up or started (this takes place, for example, at the point of the time axis denoted by 0). The boot program or its call address is stored, for example, in a predetermined memory area or at a predetermined address which, as standard, is executed or called up first upon start of the arithmetic logic unit.

Boot program BP prompts, in sequential order, an integrity check of multiple computer programs SW1, SW2, . . . , SWN and the start of the computer programs after a successful integrity check. Thus, in the example shown, first of all the integrity check of a first computer program SW1 is prompted (arrow 11). The integrity check is carried out utilizing computer kernel K, which especially may take the form of a hardware-acceleration computer kernel, that transmits (arrow 12) an answer which relates to the integrity of the computer program to the boot program. After the integrity check of first computer program SW1 is concluded, if its integrity is confirmed, as indicated here, the start of first computer program SW1 is prompted (arrow 14) or allowed by the boot program.

In the same way, the integrity check of second computer program SW2 is prompted (arrow 13), the one computer kernel being used again for that purpose. After transmission (arrow 15) of the answer, given a successful integrity check as shown, second computer program SW2 is started, that is, its start is prompted (arrow 16). This is continued until the last computer program SWN in the series of computer programs to be started is reached The boot program prompts (arrow 17) an integrity check for it as well, the integrity check being carried out by the computer kernel which transmits (arrow 18) a corresponding answer to the boot program and, if the integrity is confirmed, prompts its start (arrow 19). Finally, when all computer programs are started, the boot program may be ended.

It is clearly evident that the total duration of the boot process is determined essentially by the sum of the durations for the individual integrity checks of computer programs SW1, SW2, . . . , SWN.

For the sake of clarity, arrows which relate to actions that take place essentially simultaneously were drawn in with a little vertical or temporal distance in FIGS. 1 through 3. This is not intended to be restrictive to the effect that these actions must proceed in this order. Two or more of these actions, which take place contiguously, may take place simultaneously or close to each other in time in any order (naturally to the extent possible as far as the logic operation is concerned). For example, in FIG. 1, arrow 13 (prompting the integrity check of second computer program SW2) is drawn in above or prior in time to arrow 14 (prompting the start of first computer program SW1). These two processes may likewise take place essentially simultaneously or in reverse order. This is dependent, namely, on the implementation of the boot program and on the available hardware (for instance, a boot program which runs in parallelized fashion on two processor kernels could prompt the corresponding actions virtually simultaneously). This holds true not only for FIG. 1, but also for FIGS. 2 and 3.

An integrity check within the scope of the present invention may be carried out completely by one computer kernel, so that as answer, the computer kernel returns to the boot program a code which indicates whether or not the integrity is confirmed. It is also possible for the integrity check to be carried out partially by the boot program, with computing-intensive tasks being performed by the computer kernel. For instance, if a message authentication code (MAC) is used for the integrity check, the computer kernel may calculate an actual MAC that is returned to the boot program, which then compares it to a reference MAC in order to confirm or not confirm the integrity.

FIG. 2 shows a boot sequence of an arithmetic logic unit having a plurality of computer kernels K1, K2, . . . , KL according to two preferred embodiments of the present invention. In this case, the integrity check for each of computer programs SW1, SW2, . . . , SWN is carried out in parallelized fashion, that is, simultaneously by several of computer kernels K1, K2, . . . , KL.

In order to achieve this, two possibilities (embodiments) are provided. First of all, the cryptographic algorithm used for the integrity check may be selected in such a way that it is able to be parallelized, that is, when applied to a single element to be checked, different parts of the algorithm are implemented at least to some extent simultaneously by different computer kernels. Secondly, a computer program to be checked may be formed by multiple computer-program parts (e.g., corresponding to different memory sections), that is, the computer program is split into multiple computer-program parts which are checked independently of each other at least to some extent simultaneously by different computer kernels. In the case of the second possibility, it is also possible for computer-program parts of different computer programs to be checked simultaneously for their integrity. Combinations of the two possibilities are possible, as well. For example, if, because of the overhead caused by the parallelizing, the cryptographic algorithm is not able to be parallelized expediently on more than two computer kernels, then in the case of four given computer kernels, a computer program may be divided into two computer-program parts, which in each case are carried out with the parallelized algorithm on two computer kernels.

The procedure accordingly is as follows. First of all, a boot program BP is started again (as in FIG. 1), which controls the boot sequence. It initially prompts (arrow 21) the integrity check of first computer program SW1, several computer kernels K1, K2, . . . , KL being used simultaneously, according to the two possibilities above (here, for example, all computer kernels being used, the use of only a portion of the computer kernels also being possible, and then, for example, the further computer kernels could be used for computer-program parts of other computer programs, as already mentioned). Each computer kernel transmits an answer (arrow 22) to the boot program; here, by way of example, the check by the various computer kernels in each case takes the same time, so that the answers are transmitted virtually concurrently. In the case of the first possibility, the answers are formed according to an implementation of the parallelized cryptographic algorithm. Thus, the integrity may be confirmed by the boot program based on the multiple answers (if the integrity check is successful, otherwise the integrity is not confirmed). In the case of the second possibility, the answers indicate directly whether the integrity of the respective computer-program parts is confirmed, or the answers are formed as code (e.g., actual MAC), based on which the boot program is able to confirm the integrity. Boot program BP then prompts (arrow 23) the start of the computer program if, based on the answers of the parallelized cryptographic algorithm, the integrity of the computer program is confirmed or if the integrity is confirmed for each of the computer-program parts which form the computer program.

After, or simultaneously or shortly before (directly after the integrity is confirmed) first computer program SW1 was started or rather its start was prompted (arrow 23), boot program BP prompts (arrow 24) the integrity check of second computer program SW2, several computer kernels being used simultaneously, according to the two possibilities above. The procedure here is analogous to the integrity check of the first computer program and, if the integrity of second computer program SW2 is confirmed based on the answers (arrow 25), boot program BP prompts (arrow 26) the start of second computer program SW2.

This procedure is continued for the further computer programs up to last computer program SWN, for which boot program BP prompts (arrow 27) the integrity check, several computer kernels being used simultaneously, according to the two possibilities above. The procedure here is again analogous to the integrity check of the first computer program and, if the integrity of last computer program SWN is confirmed based on the answers (arrow 28), boot program BP prompts (arrow 29) the start of last computer program SWN. Finally, when all computer programs are started, boot program BP may be terminated, provided it is not still performing other tasks.

FIG. 3 shows a boot sequence of an arithmetic logic unit according to a further preferred embodiment of the present invention. Here, different computer programs SW1, SW2, . . . , SWL, . . . , SWN are checked in parallel by different computer kernels K1, K2, . . . , KL.

First of all, (as in FIGS. 1 and 2), a boot program BP which controls the boot sequence is started again here, as well. If the total number of computer programs to be checked is less than the number of the computer kernels, the boot program prompts the integrity check of a number of computer programs which is equal to or less than the total number of computer programs to be checked. If the number of computer programs SW1, SW2, . . . , SWL, . . . , SWN to be checked is greater than the number of computer kernels K1, K2, . . . , KL, boot program BP initially prompts the integrity check of a number of computer programs SW1, SW2, . . . , SWL which is equal to or less than the number of computer kernels. In each case, the integrity checks may be prompted essentially simultaneously or in short succession The integrity checks of the different computer programs are performed at least to some extent simultaneously utilizing different computer kernels. For example, in the case sketched in the figure, the total number of computer programs SW1, SW2, . . . , SWL, . . . , SWN is greater than the number of computer kernels K1, K2, . . . , KL. First computer program SW1 is checked by first computer kernel K1, second computer program SW2 is checked by second computer kernel K2 and a center computer program SWL is checked by last computer kernel KL, in each instance prompted (arrows 31) by boot program BP.

As soon as a computer kernel has ended the calculations for the integrity check, it transmits an answer to the boot program, which (as already explained) confirms or does not confirm the integrity of the respective computer program or, based on which, the integrity of the respective computer program is able to be confirmed or not confirmed by the boot program.

For instance, the integrity check of first computer program SW1 is first ended, so that after transmission (arrow 32) of the answer to boot program BP, the boot program prompts (arrow 33) the start of the second computer program, if the integrity check was successful, that is, the integrity is confirmed. The integrity checks of second computer program SW2 and of center computer program SWL are ended essentially simultaneously here, for example, so that after transmission of the answers (arrow 35) to boot program BP, the boot program prompts (arrow 36) the start of second computer program SW2 and of center computer program SWL. The prompting of the integrity check, the transmission of the answers and the start of the respective computer program are not drawn in for the further computer programs which lie between second computer program SW2 and center computer program SWL. The start (its specific point in time is subject to the specific duration of the corresponding integrity check) of these further computer programs may be before or after (or simultaneous with) the start of second computer program SW2 and of center computer program SWL. Of the integrity checks of computer programs SW1, SW2, . . . SWL drawn in, the integrity check of center computer program SWL is ended last, so that after the answer is transmitted to the boot program, the boot program finally prompts the start of the first computer program.

As soon as a computer kernel has ended the integrity check of the respective computer program, it may be used to check the integrity of a further computer program. In FIG. 3, for example, boot program BP prompts (arrow 34) the integrity check of last computer program SWN by computer kernel K2 after it has ended the integrity check of second computer program SW2. Thus, the integrity check of last computer program SWN is able to begin before the integrity check of center computer program SWL has ended. For the sake of completeness, it is also drawn in that the answer from the integrity check is transmitted (arrow 37) to boot program BP, and last computer program SWN is started (arrow 38). Of course, computer kernels other than first computer kernel K1 may also be used for the integrity check of computer programs, as soon as the corresponding computer kernel is available.

If the total number of computer programs is equal to or less than the number of computer kernels, in principle, all computer programs may be checked simultaneously in parallel, the case also being possible here (for instance if not all computer kernels are to be used for integrity checks, but rather some are intended to be kept free for other tasks), that initially not all computer programs are checked simultaneously, but rather only a portion of them, and the further computer programs are checked afterwards.

Naturally, the embodiment of FIG. 3 may be combined with the embodiments of FIG. 2. For instance, two computer kernels may check one computer program according to the embodiments of FIG. 2, while parallel to that, two other computer kernels check two computer programs according to the embodiment of FIG. 3. The embodiment of FIG. 3 may also be viewed as limiting case of the second possibility/embodiment of FIG. 2, namely, that a computer program is formed by a single computer-program part.

In general, every computer program may be formed by one or more computer-program parts. Instead of being used on computer programs, the procedure of FIG. 3 may also be used on computer-program parts. The only difference is that the start of a computer program, which is formed of multiple computer-program parts, is not prompted until the integrity of all computer-program parts which form this computer program is confirmed. In this sense, the embodiment of FIG. 3 may also be viewed as a generalization of the second possibility/embodiment of FIG. 2. If a computer program is formed by multiple computer-program parts, a reference-MAC and/or a signature is provided for each individual computer-program part. The division into computer-program parts is thus predetermined and does not take place dynamically during the boot sequence.

The number of computer-program parts which form a computer program is advantageously equal to the number of computer kernels. This permits the fastest possible integrity check of a computer program. However, it may also be provided that all computer-program parts have the same size. In this way, the length of time necessary for the integrity check of each of the computer-program parts is the same.

If each computer program is formed by one or more computer-program parts, a prioritization may be provided for the integrity check of the computer-program parts, for instance, computer-program parts may be prioritized according to an intended starting order of computer programs, that is, computer-program parts of computer programs which should be started relatively earlier have a higher priority than computer-program parts of computer programs which should be started later. Notwithstanding the above, computer-program parts may be checked first which, together with computer-program parts that are already checked or are being checked for integrity at the moment, form one computer program.

These general statements hold true both for the second embodiment of FIG. 2 as well as for FIG. 3, when applied to computer-program parts.

Figure 4:
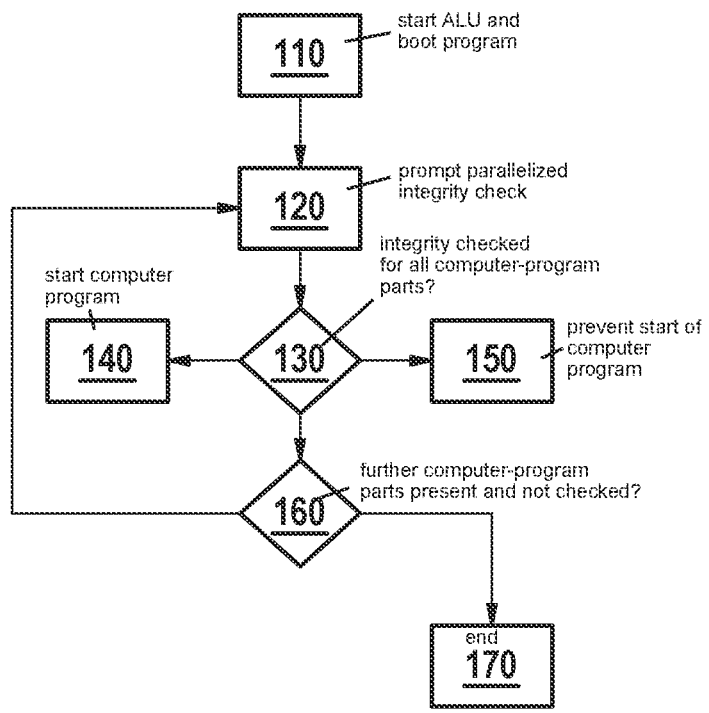
FIG. 4 shows a flowchart according to one preferred specific embodiment.

FIG. 4 shows a flowchart according to one preferred specific embodiment. In step 110, the arithmetic logic unit, and with it the boot program which controls the start sequence, is started.

In step 120, the boot program prompts a parallelized integrity check of computer programs or computer-program parts by a plurality of computer kernels. This may be carried out according to the embodiments described in connection with FIGS. 2 and 3.

In step 130, the boot program checks whether the integrity was checked for all computer-program parts, which together form one computer program. If this is the case and if the integrity check was successful for the respective computer program, that is, if its integrity was confirmed, the corresponding computer program is started in step 140. On the other hand, if the integrity for a computer program (whose program parts were all checked) is not confirmed, in step 150, the start of this computer program is prevented, since in the context of the integrity check, a manipulation must be assumed. In this case, an error message or the like may also be generated and/or the start of all computer programs may be prevented and/or the start sequence of the arithmetic logic unit may be aborted and/or other suitable measures may be taken, for example, the access to safety-related data (cryptographic keys) may be prevented.

In step 160, it is checked whether further computer-program parts are present which have not yet been checked up to now. If this is the case, provided computer kernels are available, the integrity check is prompted for these or at least some of these computer-program parts (that is, proceed according to step 120). This is again carried out in parallelized fashion, that is, parallelized with integrity checks not yet concluded.

On the other hand, if no computer-program parts are present that are not yet checked, the method may be ended in step 170, in doing so, the boot program also being able to be ended if it does not have to accomplish other tasks.

Instead of or in addition to the check in step 160, in principle, a list or table may also be provided, according to which the integrity checks of computer programs or computer-program parts are prompted at specific points in time or according to which the integrity check of predetermined computer-program parts is prompted, as soon as the integrity check of certain computer-program parts is completed. The sequence may be coded explicitly in the boot program, as well.

Figure 5:
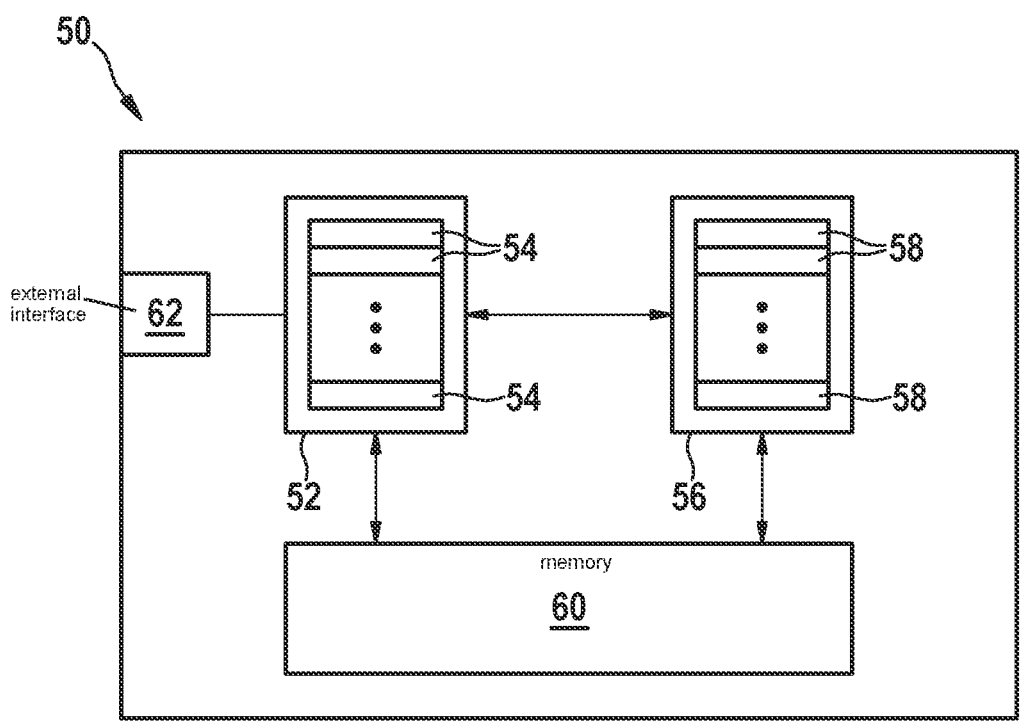
FIG. 5 shows, by way of example, the configuration of a microcontroller which is suitable for implementing a method according to the present invention.

By way of example, FIG. 5 shows in highly simplified fashion the design of a microcontroller 50, e.g., of an electronic control unit of a vehicle or of another machine which is suitable for the implementation of a method according to the present invention. Microcontroller 50 includes a processor 52 that has one or more processor-computer kernels 54, a hardware-acceleration unit 56 that has one or preferably several hardware computer kernels 58, a memory 60 and an external interface 62. Processor 52, hardware-acceleration unit 56 and memory 60 are interconnected for the exchange of data, for instance, with the aid of a bus and/or by point-to-point connections, the data connection between hardware-acceleration unit 56 and memory 60 also being able to be implemented indirectly via processor 52. Some or all of these elements of the microcontroller may be integrated in a single microchip. Processor 52 is equipped to execute computer programs which are stored in memory 60. The computer-program parts of which the computer programs are formed may be stored in particularly intended memory areas of memory 60. In addition to the boot program, the computer programs are used, namely, to implement the actual functionality of the microcontroller, that is, the functions for which the microcontroller is provided. In the case of a microcontroller in an electronic control unit, these are the control functions. Processor 52 is connected to interface 62 for the exchange of data, and via it, is able to transmit data to the outside and/or receive data from the outside, e.g., to transmit control commands and to receive sensor data.

Hardware-acceleration unit 56 (that is, its hardware-accelerator computer kernels 58) implements certain functions, particularly cryptographic functions, in the form of a hardware circuit, permitting them to be carried out with a high speed that is markedly higher than the speed which is reached when the same function is implemented as software or computer program that is executed by processor 52, that is, by its processor-computer kernels 54. The hardware-acceleration unit may be part of a hardware security module (HSM). Hardware-accelerator computer kernels 58 may be realized as an application-specific integrated circuit (ASIC), for example, or in a field programmable gate array (FPGA).

In particular, memory 60 is a non-volatile memory, e.g., a flash memory. Different from what is shown in the figure, the memory may also be made up of multiple parts referred to as sub-memories. One or more sub-memories, or, in the case of a single memory, this single memory, may also be implemented as external memory elements and be connected to the microcontroller via an external interface (e.g., an SPI interface). Various memory areas may be provided in the memory or the sub-memories which are used to store various data and/or computer programs and for which there are different access authorizations. For instance, a reference-MAC memory area and/or a reference-signature memory area may be provided which can only be accessed by an HSM that is possibly included in the microcontroller and that, for instance, is implemented together with the hardware-accelerator computer kernels (that is, as hardware-acceleration unit) or includes them. Likewise, a boot memory area could be provided in which the boot program is stored and which cannot be changed (one time programmable memory or OTP memory).

What is claimed is:

1. A method for safely starting an arithmetic logic unit that includes a plurality of computer kernels, software being started which includes multiple computer-program parts that form one or more computer programs, the method comprising the following steps:

implementing an integrity check of the computer-program parts, the integrity check being carried out in parallelized fashion utilizing at least two of the plurality of computer kernels at least to some extent simultaneously; and executing a computer program of the one or more computer programs by the arithmetic logic unit based on the integrity of the computer-program parts, which form the computer program, being confirmed.

2. The method as recited in claim 1, further comprising: based on the integrity of a computer-program part not being confirmed, preventing execution of a computer program of the one or multiple computer programs which includes the unconfirmed computer-program part.

3. The method as recited in claim 1, wherein the integrity check is carried out using a digital signature and/or a message authentication code.

4. The method as recited in claim 1, further comprising the following steps:
executing, immediately after the arithmetic logic unit is started, a boot program by the arithmetic logic unit, the boot program being stored at least partially in an unalterable memory area and/or being stored in a memory area protected from changes, the boot program being configured to prompt the integrity check of the computer-program parts and to prompt the execution of a computer program for which the integrity of the computer-program parts, which form the computer program, was confirmed.

5. The method as recited in claim 1, wherein the arithmetic logic unit is a microcontroller.

6. The method as recited in claim 1, wherein the integrity check is accomplished by way of a cryptographic algorithm able to be parallelized, the integrity check of a single computer-program part being carried out at least to some extent simultaneously in different ones of the computer kernels.

7. The method as recited in claim 1, wherein the integrity check of at least two different program parts which form the same computer program is carried out in at least two different computer kernels in a manner overlapping in time.

8. The method as recited in claim 1, wherein at least one of the one or multiple computer programs is formed by a number of computer-program parts which is equal to a number of computer kernels, the integrity check of the computer-program parts which form the at least one computer program being carried out at least to some extent simultaneously in different computer kernels.

9. The method as recited in claim 1, wherein one joint integrity check of a specific quantity of the multiple computer-program parts is carried out, the specific quantity including more than one computer-program part, and wherein in the joint integrity check, an intermediate check value is determined in parallelized fashion for each computer-program part of the specific quantity utilizing at least two of the plurality of computer kernels at least to some extent simultaneously, and based on the intermediate check values, an ultimate check value being determined and compared to a reference check value.

10. The method as recited in claim 1, further comprising:
checking whether one computer kernel of the plurality of computer kernels is available for use in an integrity check; and
based on a computer kernel being available, selecting one computer-program part whose integrity was not yet checked and is not being checked at the moment, and starting the integrity check for the selected computer-program part;
wherein the computer-program part is selected which, together with another computer-program part for which the integrity check was already carried out or is being carried out at the moment, forms a computer program, and/or the computer-program part is selected having a highest possible priority according to a predetermined prioritization.

11. The method as recited in claim 10, wherein: (i) in the selection of a computer-program part, the computer kernels are selected according to an integrity-check computing power which they exhibit with regard to the integrity check, the selection being carried out according to a descending order of the integrity-check computing power; and/or (ii) in the selection, computer kernels are excluded whose integrity-check computing power lies below a predetermined threshold.

12. An arithmetic logic unit including a plurality of computer kernels, software being started which includes multiple computer-program parts that form one or more computer programs, the arithmetic logic unit configured to:
implement an integrity check of the computer-program parts, the integrity check being carried out in parallelized fashion utilizing at least two of the plurality of computer kernels at least to some extent simultaneously; and
execute a computer program of the one or more computer programs by the arithmetic logic unit based on the integrity of the computer-program parts, which form the computer program, being confirmed.

13. The arithmetic logic unit as recited in claim 12, wherein the arithmetic logic unit is a microcontroller.

14. The arithmetic logic unit as recited in claim 12, wherein the arithmetic logic unit is configured to execute, immediately after the arithmetic logic unit is started, a boot program, the boot program being stored at least partially in an unalterable memory area and/or being stored in a memory area protected from changes, the boot program being configured to prompt the integrity check of the computer-program parts and to prompt the execution of a computer program for which the integrity of the computer-program parts, which form the computer program, was confirmed.

15. A non-transitory machine-readable storage medium on which is stored a computer program for safely starting an arithmetic logic unit that includes a plurality of computer kernels, software being started which includes multiple computer-program parts that form one or more computer programs, the computer program, when executed by the arithmetic logic unit, causing the arithmetic logic unit to perform the following steps:
implementing an integrity check of the computer-program parts, the integrity check being carried out in parallelized fashion utilizing at least two of the plurality of computer kernels at least to some extent simultaneously; and
executing a computer program of the one or more computer programs by the arithmetic logic unit based on the integrity of the computer-program parts, which form the computer program, being confirmed.

16. The non-transitory machine-readable storage medium as recited in claim 15, wherein the computer is a boot program.

\* \* \* \* \*